(12) United States Patent
Park et al.

(10) Patent No.: US 9,563,602 B2
(45) Date of Patent: Feb. 7, 2017

(54) METHOD OF ANALYZING 3D GEOLOGICAL STRUCTURE USING STRUCTURE INDEX

(75) Inventors: Gyesoon Park, Gyeonggi-do (KR); Chul-Ho Heo, Daejeon (KR)

(73) Assignee: KOREA INSTITUTE OF GEOSCIENCE AND MINERAL RESOURCES, Daejeon (KR)

( * ) Notice: Subject to any disclaimer, the term of this patent is extended or adjusted under 35 U.S.C. 154(b) by 960 days.

(21) Appl. No.: 13/618,105

(22) Filed: Sep. 14, 2012

(65) Prior Publication Data
US 2013/0144574 A1 Jun. 6, 2013

(30) Foreign Application Priority Data

Dec. 6, 2011 (KR) .......................... 10-2011-0129545

(51) Int. Cl.
*G06F 17/10* (2006.01)
*G01V 11/00* (2006.01)
*G01V 99/00* (2009.01)

(52) U.S. Cl.
CPC .............. *G06F 17/10* (2013.01); *G01V 11/00* (2013.01); *G01V 99/005* (2013.01)

(58) Field of Classification Search
None
See application file for complete search history.

(56) References Cited

U.S. PATENT DOCUMENTS

2008/0059075 A1* 3/2008 Colombo et al. ............... 702/18

FOREIGN PATENT DOCUMENTS

KR 100610886 B1 8/2006
KR 1002008005305 A 6/2008

OTHER PUBLICATIONS

Park et al., "3-D Geological Structure Interpretation by the Integrated Analysis of Magnetotelluric and Gravity Model at Hwasan Caldera", Journal of the Korean Earth Science Society, vol. 32, Issue 6, Oct. 2011, pp. 548-559.*
English translation of Park et al., "3-D Geological Structure Interpretation by the Integrated Analysis of Magnetotelluric and Gravity Model at Hwasan Caldera", Journal of the Korean Earth Science Society, vol. 32, Issue 6, Oct. 2011, pp. 548-559.*

(Continued)

*Primary Examiner* — Omar Fernandez Rivas
*Assistant Examiner* — Herng-Der Day
(74) *Attorney, Agent, or Firm* — Fredrikson & Byron, P.A.

(57) ABSTRACT

A method of analyzing a 3D geological structure using a structure index. The method includes the steps of estimating physical property values on common coordinates to calculate two or more physical property models on the same 3D grid (L×M×N); normalizing the physical property models, thus obtaining normalized physical property models which are then represented in a scatter plot of physical properties; converting distribution positions of the normalized physical property models on the scatter plot of physical properties into type angle (TA) and into type intensity (TI); determining a minimum of TI values, which classifies two or more classes on a scatter plot of the TA and TI values, to be a threshold; and analyzing the 3D geological structure based on a local extreme point and/or points in the scatter plot for the TA and TI using the threshold.

11 Claims, 21 Drawing Sheets

(56) References Cited

OTHER PUBLICATIONS

Park et al., "Geostatistical integration of gravity and magnetotelluric data to enhance resolution of geologic structure", Journal of Applied Geophysics, vol. 73, Issue 3, Mar. 2011, pp. 232-242.*
Sung Hyo, Yun, "Development and the Structure of its Cauldron of the Hwasan Ring Igneous Complex, Northern Kyeongsang Basin, Korea", Jour. Geol. Soc. Korea, vol. 24, No. 3, p. 267-288, Sep. 1988.
Gyesoon Park et al., "Analysis of the Geological Structure of the Hwasan Caldera Using Potential Data", Jour. Korean Earth Science Society, v. 29, No. 1, p. 1-12, Feb. 2008.
Ki-Hong Chang et al., "Aspects of Tectonics and Volcanism Recorded in Cretaceous Medial Kyongsang Basin, SE Korea", Econ. Environ. Geol. vol. 30, No. 2, p. 143-151, 1997.

\* cited by examiner

METHOD OF ANALYZING 3D GEOLOGICAL STRUCTURE USING STRUCTURE INDEX

CROSS-REFERENCES TO RELATED APPLICATIONS

This patent application claims the benefit of priority from Korean Patent Application No. 10-2011-0129545, filed on Dec. 6, 2011, the contents of which are incorporated herein by reference in its entirety.

BACKGROUND OF THE INVENTION

1. Field of the Invention

The present invention relates to a method of analyzing a 3D geological structure using a structure index (SI).

2. Description of the Related Art

Recently in order to acquire more pieces of information in survey areas, a variety of techniques are being carried out to conduct multi-surveys. This is because multi-surveys minimize the risk of uncertainty of analysis stemming from the use of a single survey technique and also because the reliability of a final decision based on the survey results may be increased. For this reason, thorough research into integrated analysis to complement each data using multi-parametric geophysical data and increase the reliability of analytic results is ongoing. However, conventional analysis into multi-surveys is merely confined to the level of analyzing individual survey materials and then qualitatively collecting analytic results, undesirably making it impossible to effectively utilize the advantages of multi-surveys. This has been concluded to be because physical properties or resolutions measured using respective geophysical techniques are different from each other, and thus these are difficult to numerically summarize using a single data processing technique. For example, many attempts have been made by researchers (Vozoff and Jupp, 1975, Sill et al., 1977, Oldenburg, 1978) to make the sensitivity matrix (Jacobian matrix) of different survey data into an inversion matrix so as to form joint inversion, but are not widely utilized because solutions are numerically unstable and it is difficult to make meaningful relationships.

In some embodiments of the present invention, however, integrated analysis about the boundary information of geological structures, in lieu of a combination of physical properties, is carried out, thus overcoming the limitations of conventional integrated analysis. Such an integrated analysis technique is advantageous because the acquired data is effectively used.

SUMMARY OF THE INVENTION

Accordingly, the present invention was developed keeping in mind the problems occurring in the related art regarding multi-geophysical survey data analysis, which led to the development of a method of effectively analyzing multi-geophysical survey data so as to achieve underground geological structure analysis corresponding to the basic purpose of geophysical surveys.

Typically when geological structures are analyzed using a single physical property, it is difficult to effectively carry out an analysis under conditions of a small difference in the physical property between rock types, and thus some embodiments of the present invention provide a method of more effectively analyzing a geological structure in consideration of the correlation pattern of two or more physical property models and the characteristics thereof.

In some embodiments of the present invention, an SI method which is able to perform effective correlation analysis is provided.

The SI method consists of Type Angle (TA) and Type Intensity (TI) calculated using spatial correlations of two models, in which TA indicates the correlation pattern of two physical properties and TI indicates the distribution position in respective physical property models.

The SI method for analyzing structures using TA and TI values may be effectively employed when analyzing geological structures using multi-geophysical survey data. To further aid the understanding of the invention, this method is illustratively applied to multi-geophysical surveys in the area of a volcanic caldera and the results thereof are represented.

An embodiment of the present invention provides a method of analyzing a 3D geological structure using SI, including estimating physical property values (a density value and a resistivity value) on common coordinates to calculate two or more physical property models (for example, a density model and a resistivity model) $D_{data}(L,M,N)$ and $R_{data}(L,M,N)$ on the same 3D grid ($L \times M \times N$); normalizing the physical property models, thus obtaining normalized physical property models $ND_{data}(l,m,n)$ and $NR_{data}(l,m,n)$ which are then represented in a scatter plot of physical properties; converting distribution positions of the $ND_{data}(l,m,n)$ and $NR_{data}(l,m,n)$ on the scatter plot of physical properties into TA using a four-quadrant inverse tangent and into TI using a distance from an origin; determining a minimum of TI values, which classifies two or more classes on a scatter plot of the TA and TI values, to be a threshold; and analyzing the 3D geological structure based on a local extreme point and/or points in the scatter plot for the TA and TI using the threshold. As such, normalizing may be determined by Equation 1 below:

$$ND = [D - \text{Mean}(D)] / [(\text{Max}(D) - \text{Min}(D))/2] \qquad \text{<Equation 1>}$$

wherein D is a physical property model $D_{data}(L,M,N)$ or $R_{data}(L,M,N)$, and ND is a normalized physical property model.

The method may further include comparison which is performed in such a manner that whether or not the two or more classes overlap with each other is determined based on the determined threshold, between determining the threshold and analyzing the 3D geological structure.

As such, when the two or more classes overlap with each other under conditions of being equal to or more than the threshold, determining the threshold may be repeated so that the threshold is re-determined.

In an embodiment of the present invention, analyzing the 3D geological structure may be performed by determining a rock type, and a structure depending on physical properties and geological positions of the classes.

The method may further include, before estimating the density value on the common coordinates, surveying gravity at a position at which the 3D geological structure is to be analyzed, thus obtaining gravity data; correcting the gravity data, thus extracting a Bouguer anomaly; and performing 3D density inversion using the Bouguer anomaly, thus obtaining the density model.

The method may further include, before estimating the resistivity value on the common coordinates, surveying magnetotelluric (MT) at a position at which the 3D geological structure is to be analyzed, thus obtaining MT data; correcting the MT data based on a remote reference, thus extracting MT data; and performing 3D MT inversion using the extracted MT data, thus obtaining the resistivity model.

In the present invention, the two or more physical property models on the common coordinates may be estimated using results analyzed via inversion after the common coordinates have been set in the two or more physical property models and by ordinary kriging.

Another embodiment of the present invention provides a method of analyzing a 3D geological structure using SI, including estimating a first model value and a second model value on common coordinates to calculate a first model $D_{data}(L,M,N)$ and a second model $R_{data}(L,M,N)$ on the same 3D grid (L×M×N) having different physical properties, thus obtaining physical property models; normalizing the physical property models, thus obtaining normalized physical property models $ND_{data}(l,m,n)$ and $NR_{data}(l,m,n)$ which are then represented in a scatter plot of physical properties; converting distribution positions of the $ND_{data}(l,m,n)$ and $NR_{data}(l,m,n)$ on the scatter plot of physical properties into TA using a four-quadrant inverse tangent and into TI using a distance from an origin; determining a minimum of TI values, which classifies two or more classes on a scatter plot of the TA and TI values, to be a threshold; and analyzing the 3D geological structure based on a local extreme point and/or points in the scatter plot for the TA and TI using the threshold.

As such, normalizing may be determined by Equation 1 below:

$$ND=[D-\text{Mean}(D)]/[(\text{Max}(D)-\text{Min}(D))/2] \quad \text{<Equation 1>}$$

wherein D is a physical property model $D_{data}(L,M,N)$ or $R_{data}(L,M,N)$, and ND is a normalized physical property model.

A further embodiment of the present invention provides a method of analyzing a 3D geological structure using SI, including estimating model values on common coordinates to calculate two or more models on the same 3D grid (L×M×N) having different physical properties, thus obtaining physical property models; normalizing the physical property models, thus obtaining two or more normalized physical property models which are then represented in a scatter plot of physical properties; converting distribution positions of the normalized physical property models on the scatter plot of physical properties into TA using a four-quadrant inverse tangent and into TI using a distance from an origin; determining a minimum of TI values, which classifies two or more classes on a scatter plot of the TA and TI values, to be a threshold; and analyzing the 3D geological structure based on a local extreme point and/or points in the scatter plot for the TA and TI using the threshold.

As such, normalizing may be determined by Equation 1 below:

$$ND=[D-\text{Mean}(D)]/[(\text{Max}(D)-\text{Min}(D))/2] \quad \text{<Equation 1>}$$

wherein D is a physical property model, and ND is a normalized physical property model.

BRIEF DESCRIPTION OF THE DRAWINGS

The above and other objects, features and advantages of the present invention will be more clearly understood from the following detailed description taken in conjunction with the accompanying drawings, in which:

FIGS. 8A and 8B illustrate normalized physical property models according to the present invention, in which FIG. 8A illustrates the scatter plot of physical properties and FIG. 8B illustrate TA and TI values calculated from the physical properties;

DESCRIPTION OF SPECIFIC EMBODIMENTS

Figure 1A:
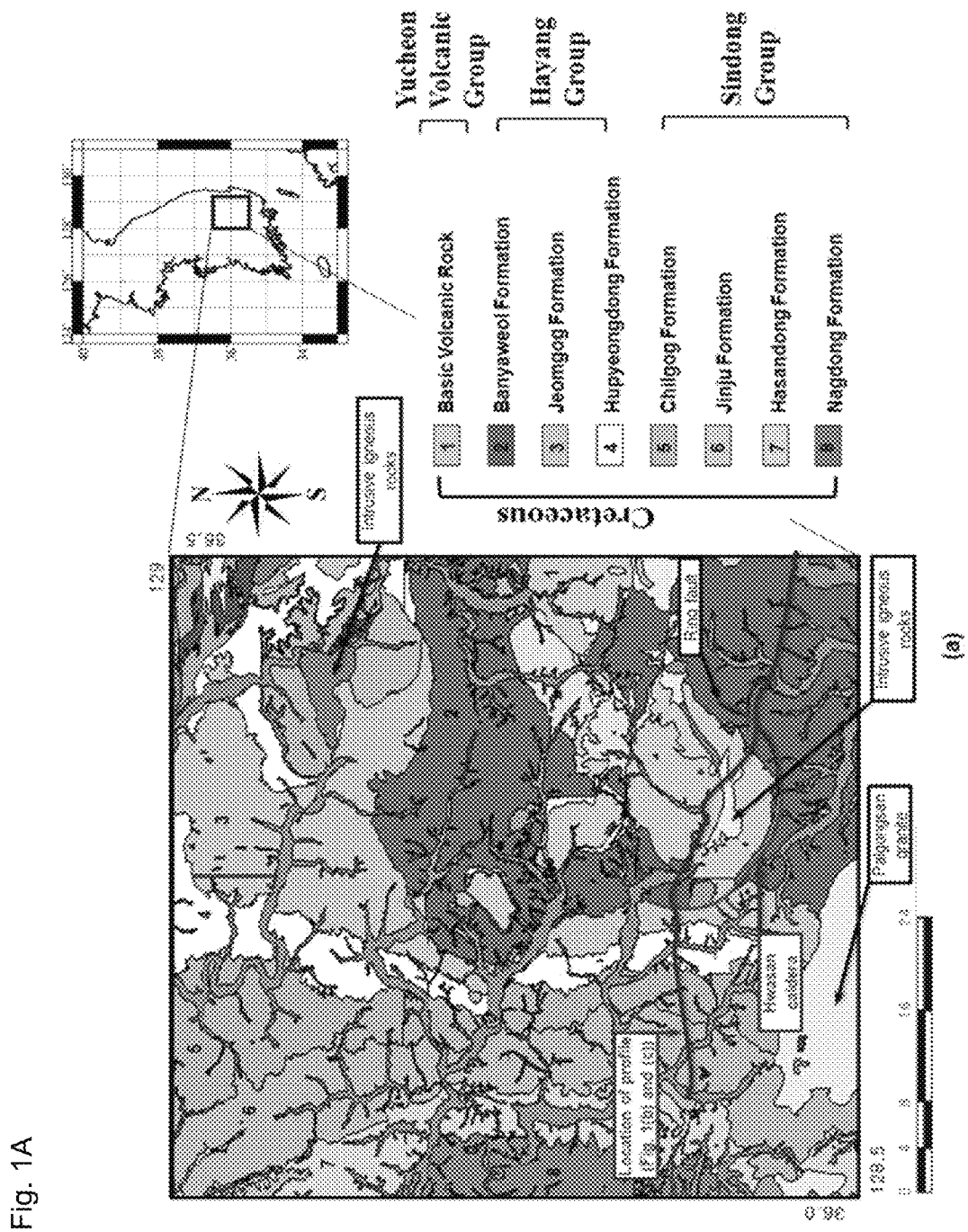
FIGS. 1A to 1C illustrate geologic map, 2-D gravity inversion result, and MT inversion result of the volcanic caldera used in an example according to an embodiment of the present invention.

Hereinafter, embodiments of the present invention will be more fully understood with reference to the appended drawings. Throughout the drawings, the same reference numerals are used to refer to the same or similar elements. Furthermore, descriptions of known techniques, even if they are pertinent to some embodiments of the present invention, are regarded as unnecessary and may be omitted when they would make the characteristics of an embodiment of the invention and the description unclear.

Figure 1B:
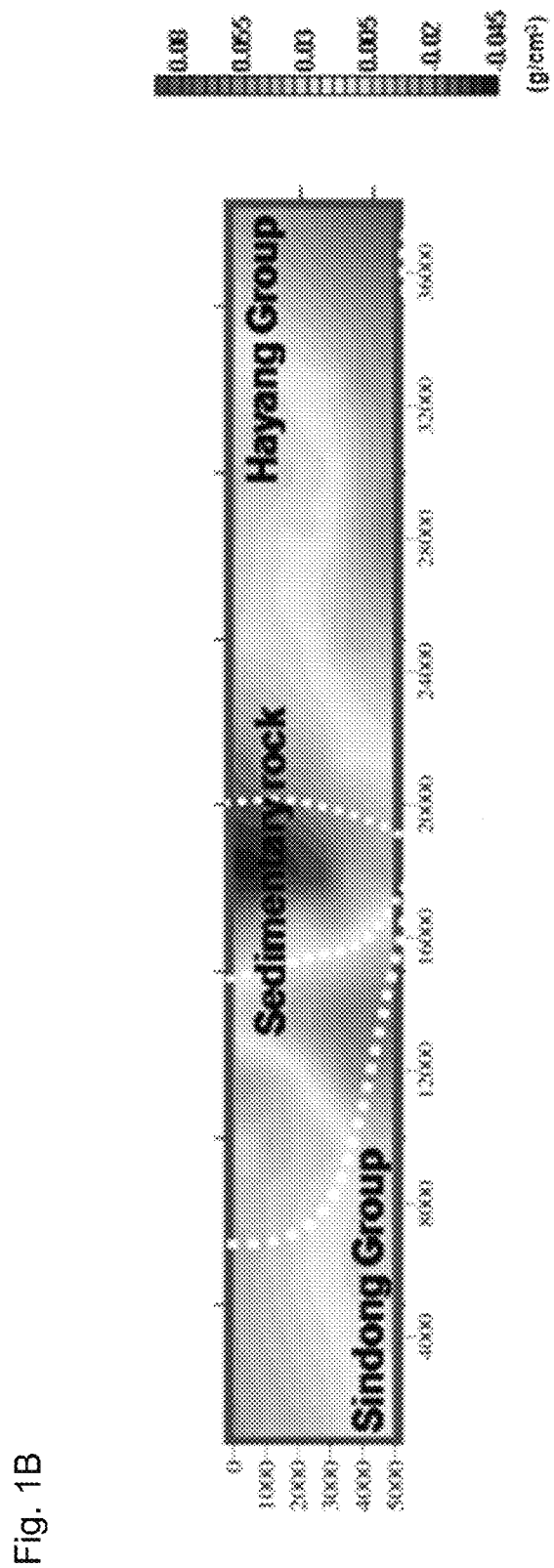
Figure 1C:
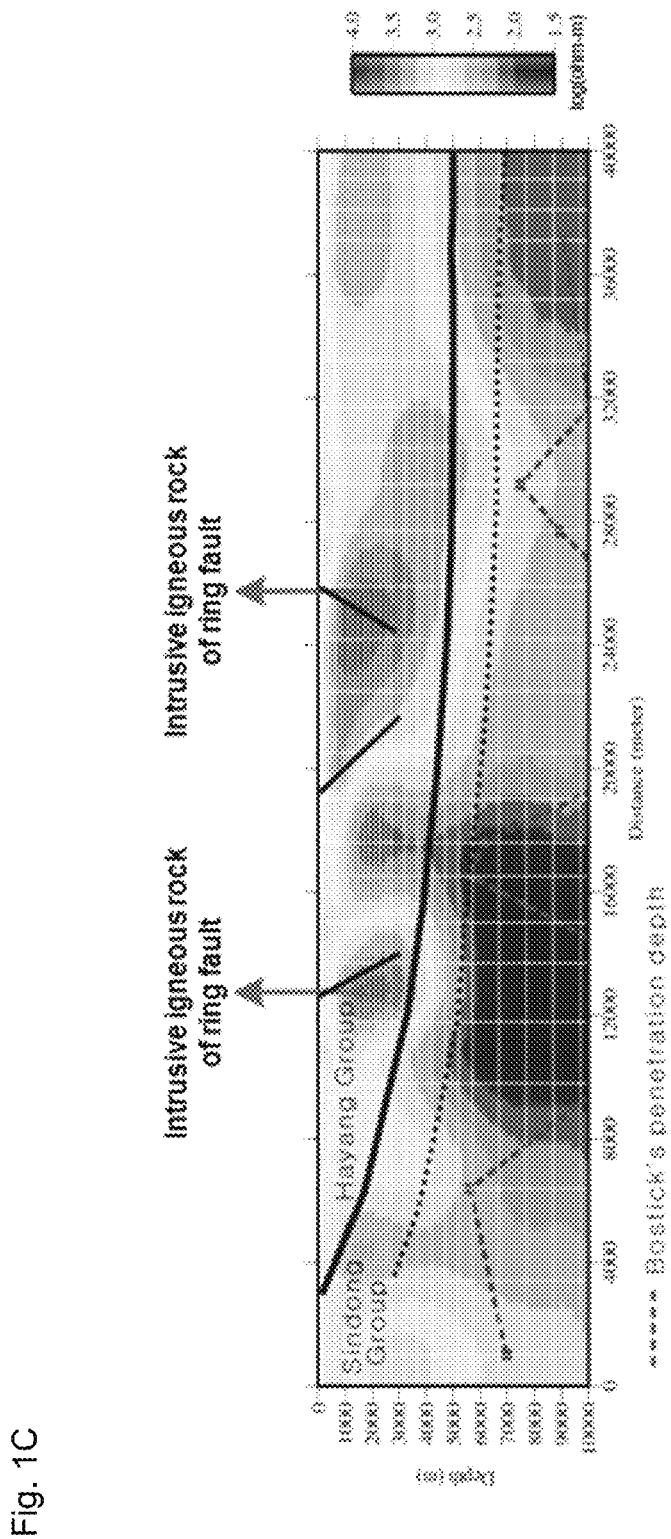
Figure 2:
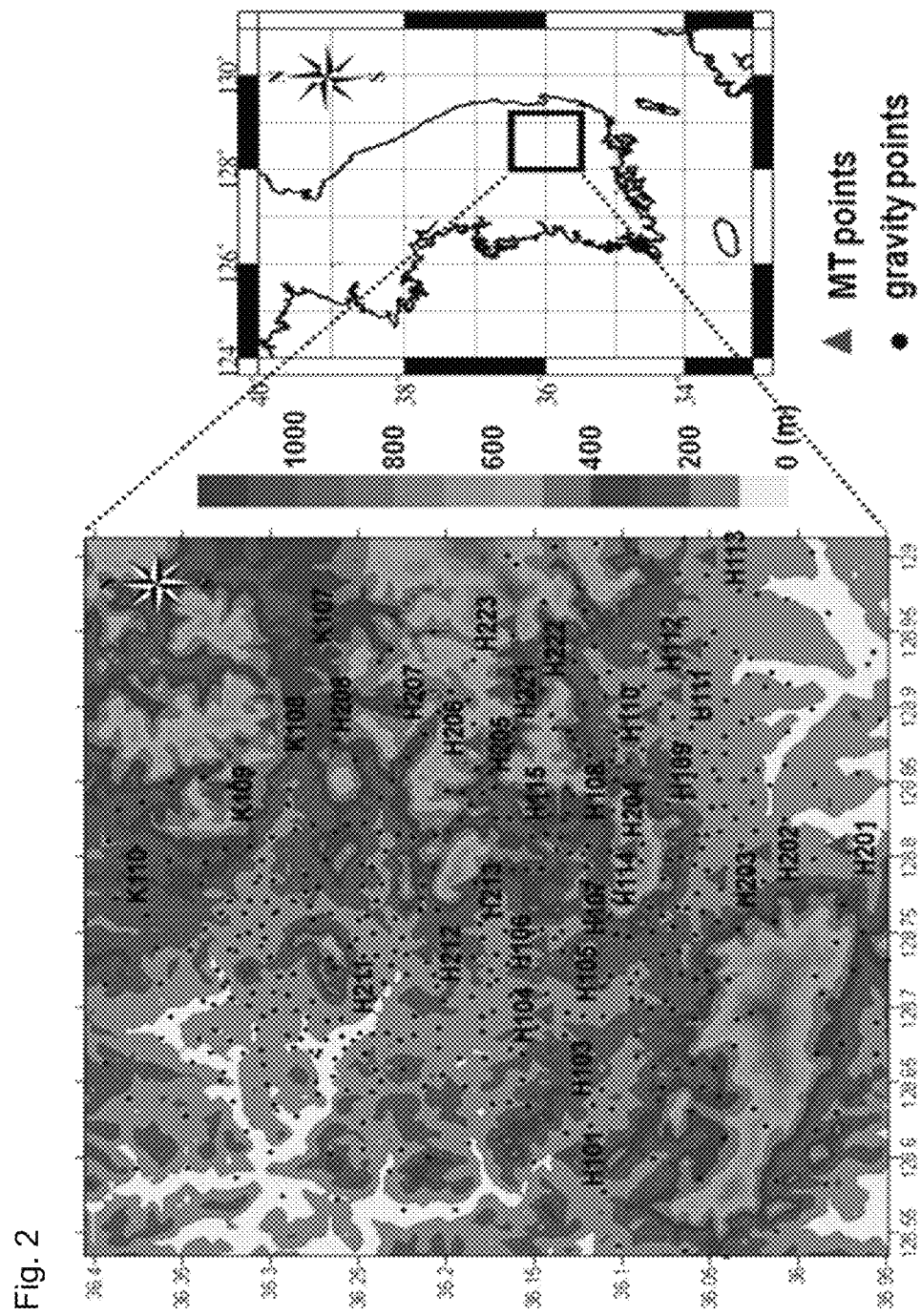
FIG. 2 illustrates a terrain map and surveys points of the volcanic caldera used in the example according to an embodiment of the present invention.

FIGS. 1A to 1C illustrate geologic map, 2-D gravity inversion result, and MT inversion result of the volcanic caldera according to an embodiment of the present invention, and FIG. 2 illustrates a terrain map thereof.

As illustrated in FIGS. 1A to 1C and 2, the volcanic caldera used in an example is the oval-shaped ring vent caldera positioned at the Euisung sub-basin in Korea, with a size of 16(EW)(N–S) km.

FIG. 1B illustrates 2D gravity survey results, and FIG. 1C illustrates 2D MT survey results performed in the same area.

The volcanic caldera used in an example is known to have been formed via central eruption, sedimentation, formation of ring faults, and eruption along the faults in the tertiary cenozico era of about 54.5 Ma (Yoon Sung-Hyo, 1988), but the accurate production mechanism or lower structure thereof has not yet been ascertained. The sedimentary rocks within the volcanic caldera are weakly folded and provided in the form of hornfels, and the central volcanic complexes which are rhyolitic are placed on the Hayang group. Also, the sedimentation pattern is seen in the central volcanic complexes, which means that additional internal eruptions occurred in the central portion and accompanied by hypabyssal magma tism and sedimentation, resulting in fault formation (Yoon Sung-Hyo, 1988; Jang Gi-Hong and Park Sun-Ok, 1997). The overall stratigraphic structure of the volcanic caldera area includes Nagdong-Hasandong-Jinju formations (Sindong Group), and Iljik-Hupyeongdong-Jeomgog-Sagog-Banyaweol-Hwasan-Chunsan formations (Hayang Group), which are sequentially positioned upwards, and the central rhyolitic volcanic complexes and igneous intrusions are known to be formed finally (Park Gyesoon et al., 2008).

Below is a description of a geophysical survey data conducted to analyze a 3D geological structure according to an embodiment of the present invention.

To analyze the 3D geological structure of the volcanic caldera located at the Euisung sub-basin in Korea, gravity survey (S10) and MT survey (S20) are first performed.

The measurement points for gravity survey are represented as black dots on the to terrain map of FIG. 2, and survey was performed at 510 points at intervals of about 1 km in the range of about 32 km around the volcanic caldera.

The gravity data measured upon gravity survey (S10) is then subjected to gravity correction (S11).

As such, gravity correction (S11) enables Bouguer anomaly data to be extracted.

To conduct gravity correction (S11), a typical gravity correction procedure, including latitude correction, tide correction, drift correction, free-air correction, Bouguer correction and terrain correction may be performed, thereby extracting gravity effects due to underground density structures.

Figure 3:
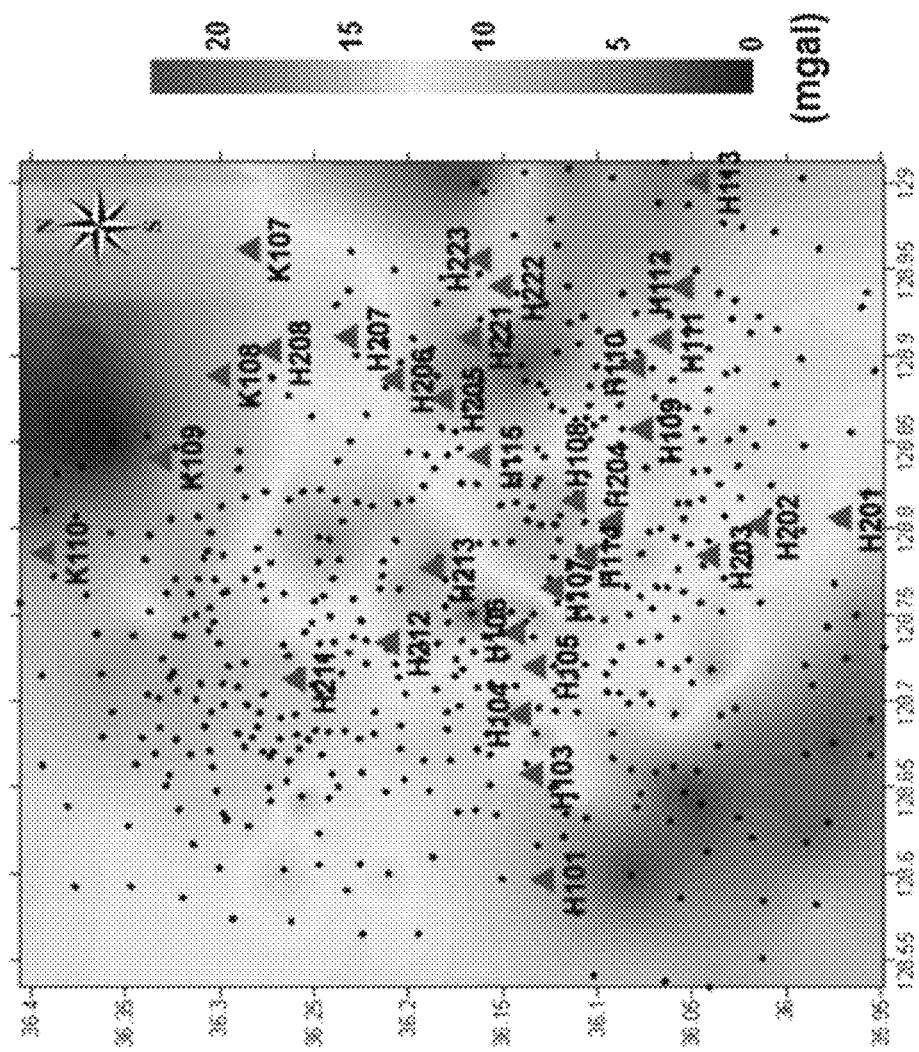
FIG. 3 illustrates Bouguer anomaly data used in the example an embodiment of the present invention, along with gravity and MT measurement points.

FIG. 3 illustrates Bouguer anomaly data extracted via gravity correction according to an embodiment of the present invention, together with gravity and MT measurement points.

As illustrated in FIG. 3, the Bouguer anomaly data is low in the northeastern and southwestern parts of the survey area. The northeastern part has a small number of gravity measurement points and thus the resulting estimation error is considered to be partially contained, and the low anomaly of the southwestern part is analyzed to be due to the low density of Palgongsan granite. Also, the volcanic caldera shows a high gravity anomaly zone at the center thereof, which is considered to be due to the effects of igneous rocks intruded along the ring fault, and the low anomaly zone of the middle of the caldera is analyzed to be due to the structure resulting from sedimentation of pyroclastic sedimentary rocks.

The Bouguer anomaly data extracted via gravity correction (S11) is then subjected to 3D density inversion (S12) using a Marquardt-Levenberg method, thus extracting a density model.

In order to stably perform 3D density inversion (S12), a restriction matrix is added to the inversion so as to obtain similar density distributions between adjacent blocks, and the lower inversion block is set to be greater than the upper inversion block. Furthermore, the range in which the density changes is set to be 0.2~0.3 g/cm (Park Gyesoon et al., 2008).

Figure 4A:
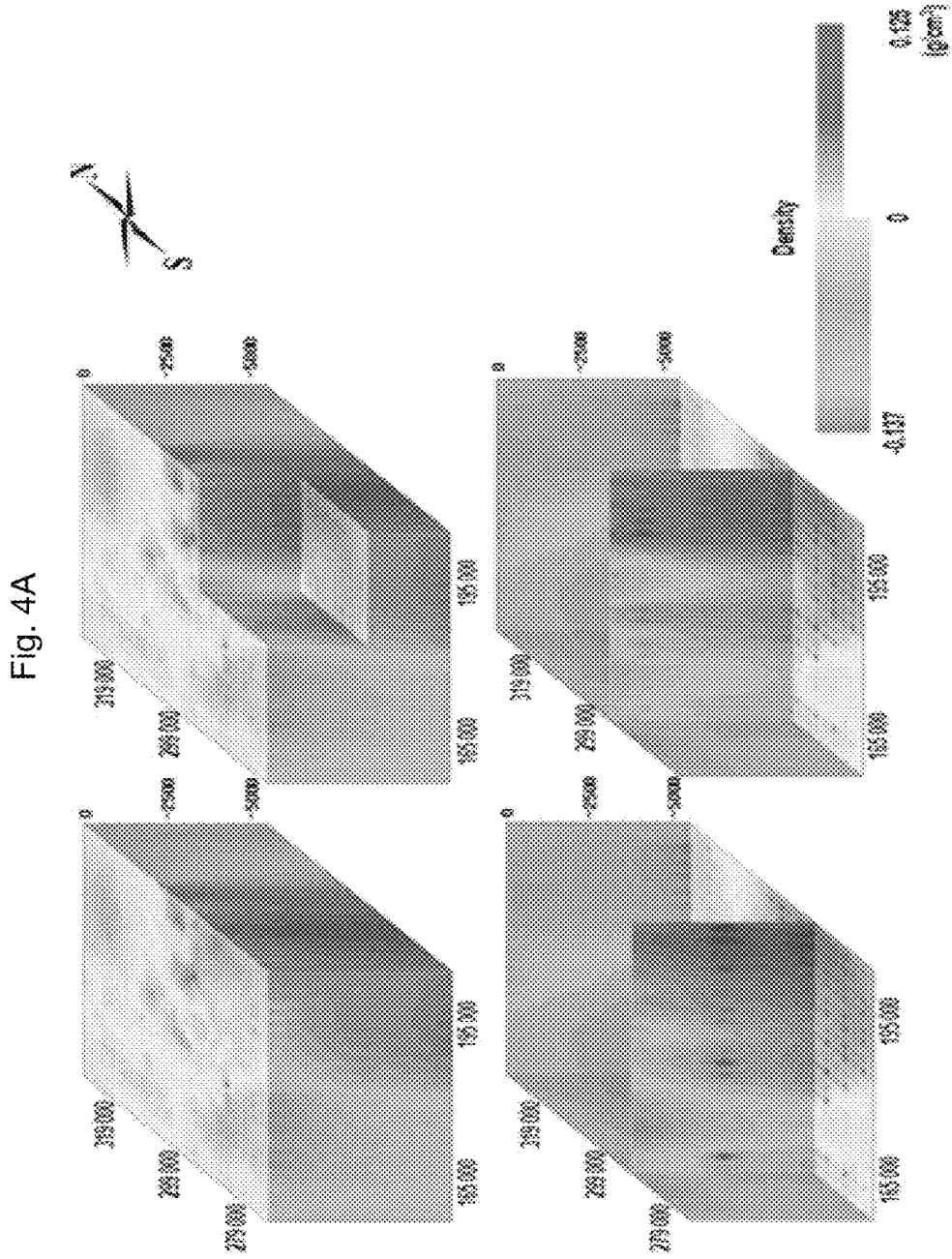
FIGS. 4A and 4B illustrate density models analyzed based on 3D density inversion results according to an embodiment of the present invention.
Figure 4B:
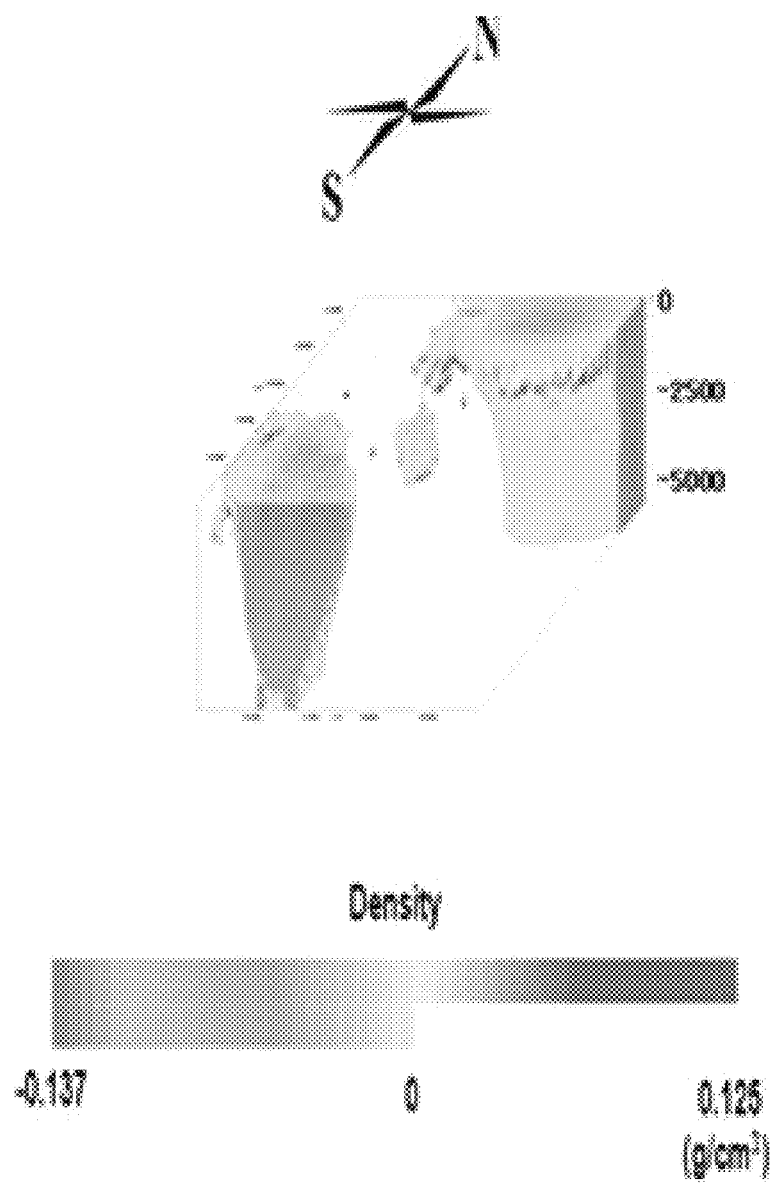

FIGS. 4A and 4B illustrate the density models analyzed based on the 3D density inversion results according to an embodiment of the present invention.

The density models analyzed based on the inversion results are depicted in FIGS. 4A and 4B. FIG. 4B illustrates the 3D image of the distribution of a low-density body, which shows the southwestern Palgongsan granite and the pyroclastic sedimentary rocks of the middle of the caldera, and the northeastern low-density body is analyzed to be a structure which is merely numerically represented because there are insufficient measurement points.

MT survey (S20) is performed under conditions of the following measurement points and system.

In the example according to an embodiment of the present invention, MT survey was performed at 32 points represented by the triangular shape in FIGS. 2 and 3 using a MTU-5A system. The distance between the measurement points is about 2~3 km, and the measurement points are radially distributed around the volcanic caldera. In the MT survey, the electric fields in two directions of N-S and E-W and the magnetic fields in three N-S, E-W and vertical directions were measured in the band range of 0.001-320 Hz. To minimize noise effects, measurements were taken for 15 hr during the nighttime when electromagnetic noise is low.

The MT data extracted via MT survey (S20) is then subjected to MT correction (S21) based on a remote reference.

Upon MT correction (S21), data obtained from the continuously operating reference station (CORS) of Esashi, Japan which is about 1,000 km away from the volcanic caldera area was used as the remote reference.

Furthermore, the MT data is corrected using an MT-Editor program which is provided together with the MTU-5A system.

The MT data corrected via MT correction (S21) is then subjected to 3D inversion (S22), thus extracting a resistivity model.

The 3D MT inversion according to some embodiments of the present invention adopts WSINV3DMT code (Siripunvaraporn et al., 2005) which is expanded from a 2D inversion method, namely, Occam's inversion (Siripunvaraporn and Egbert 2000).

To analyze the geological structure using the spatial correlation between the density model extracted via 3D density inversion (S12) and the resistivity model extracted via 3D MT inversion (S22), two models having the same coordinates are required.

To this end, common coordinates are set and a density value and a resistivity value are respectively estimated on the common coordinates in S100 and S200.

In the example of an embodiment of the present invention, estimation of the density and resistivity values on the common coordinates may be conducted using ordinary kriging based on S-GeMS (Stanford Geostatistical Modeling Software).

Figure 5A:
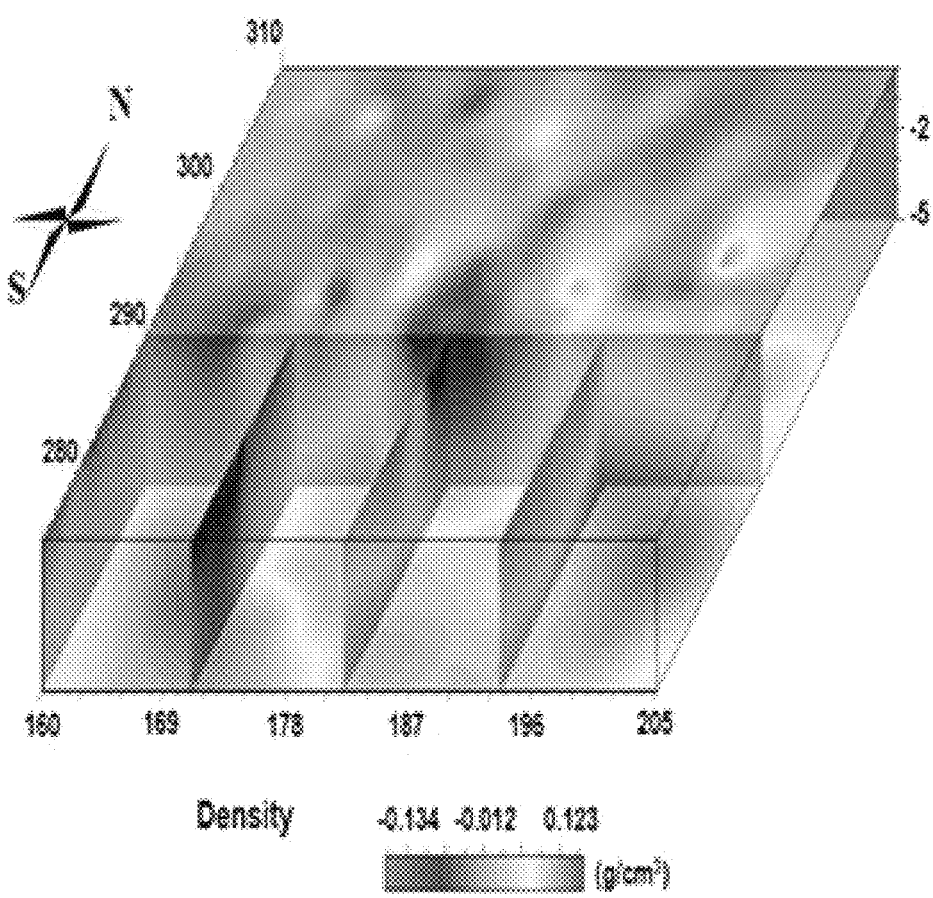
FIGS. 5A and 5B illustrate estimates of the density model and the resistivity model in the same space according to an embodiment of the present invention.
Figure 5B:
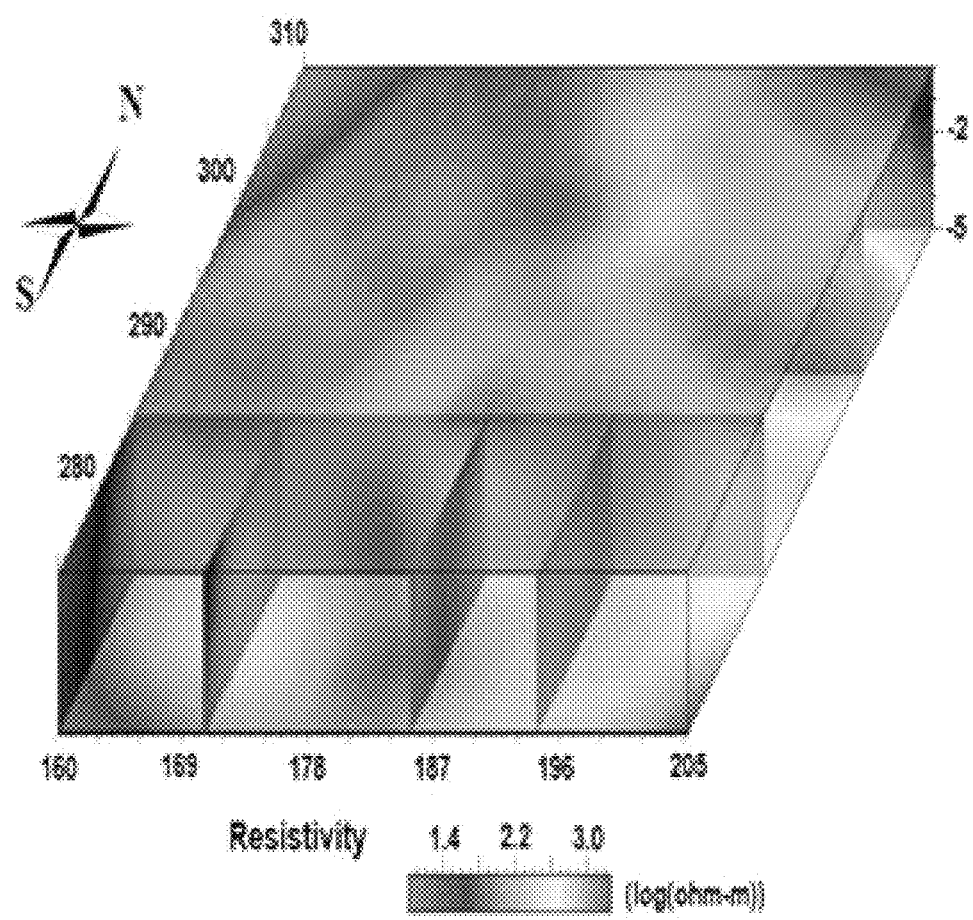

FIGS. 5A and 5B illustrate the density model and the resistivity model estimated in the same space according to an embodiment of the present invention.

Figure 6A:
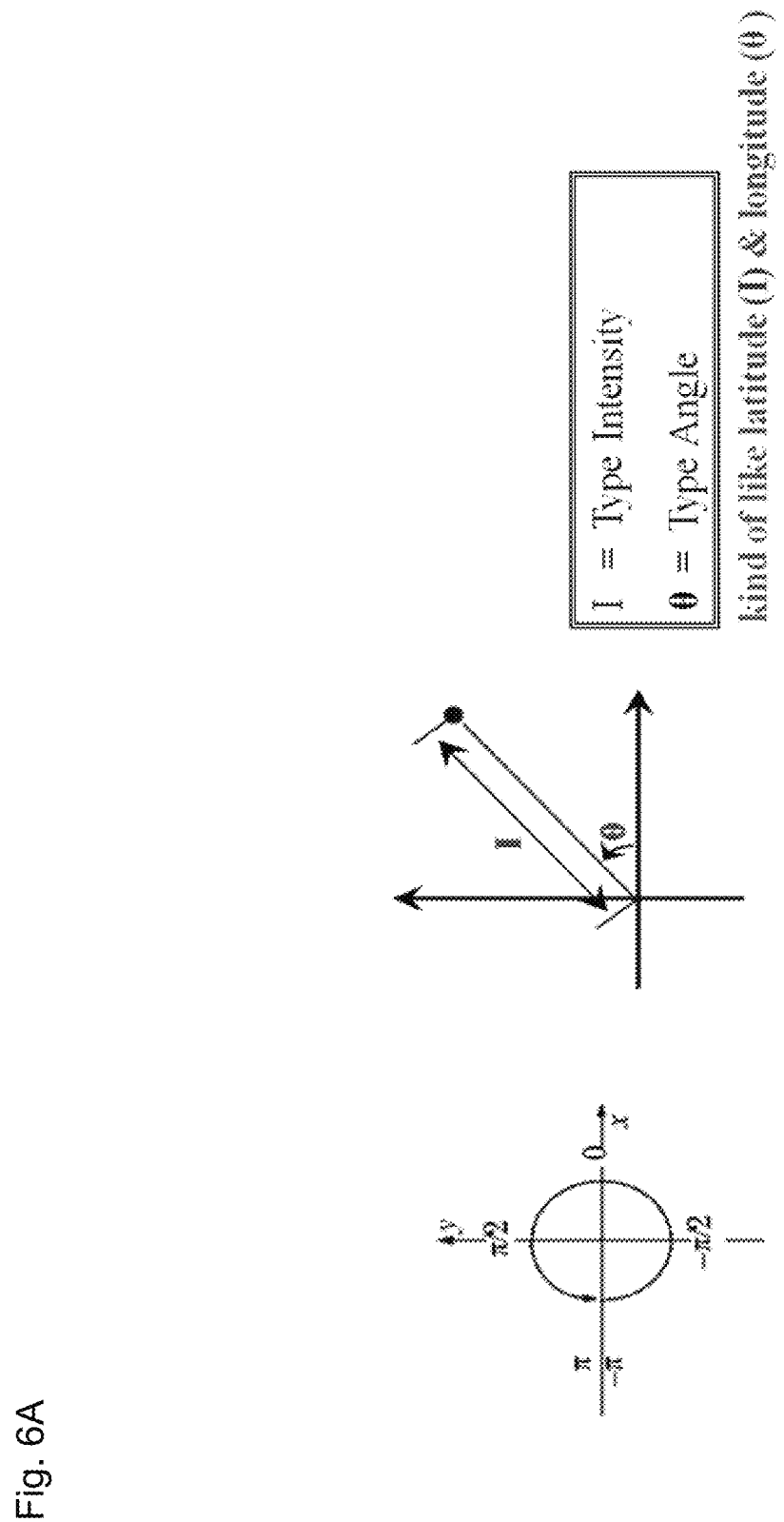
FIGS. 6A and 6B illustrate explanatory diagrams of a process of analyzing a 3D geological structure using SI according to an embodiment of the present invention.
Figure 6B:
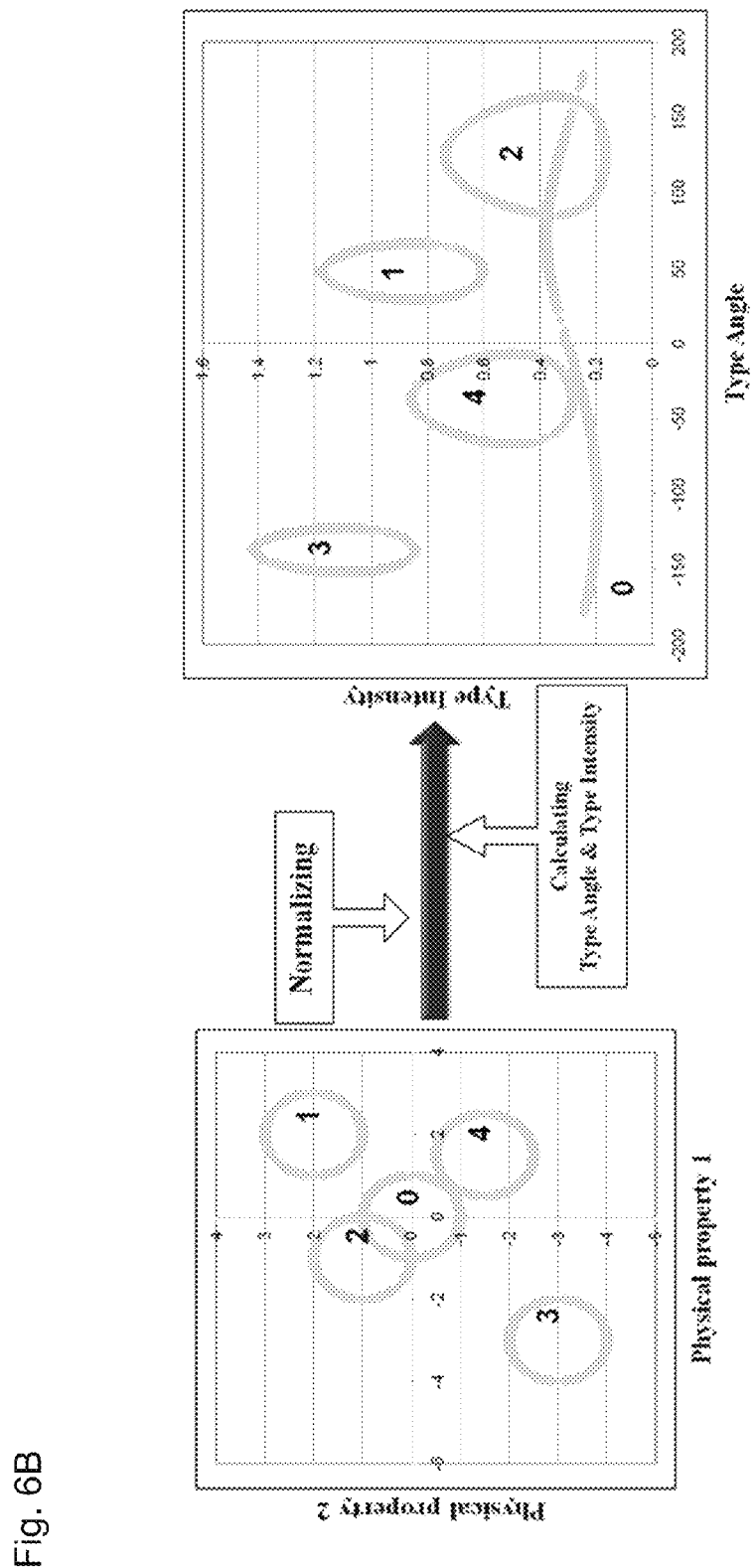

FIGS. 6A and 6B illustrate explanatory diagrams of the process of analyzing the 3D geological structure using SI according to the present invention.

As illustrated in FIGS. 6A and 6B, the method of analyzing the 3D geological structure using SI according to an embodiment of the present invention classifies structures using TA calculated from the correlation of two physical property values in the same space via the normalized physical property models and TI determined by the distribution position of the corresponding value in the same physical property model.

A projection technique such as UTM (Universal Transverse Mercator) is used to classify structures, so that TA and TI are represented just as latitude and longitude values and thus the structures are classified along curves shown on the basis of the local extream points.

Basic suppositions proposed to use the SI method according to an embodiment of the present invention are described below.

1) The physical properties analyzed in respective physical property models are different from each other but show the same underground geological structure. As a result of geophysical surveys, geological structures having different physical properties are separately analyzed.

2) The different physical property models change with the spatial correlation depending on changes in the geological structure. Because the different physical property models show the same underground geological structure based on the above 1), they have a spatial correlation.

3) The different physical property models have similar survey depths and spatial resolutions. Because the structure is analyzed using the correlation of physical properties, the different physical property models should share a similar survey space.

4) In respective physical property models, the anomaly value equal to or more than a specific value shows a specific geological structure. Even when the geological structures are different from each other, they may have similar physical property values. In this case, it is very difficult to analyze the structure using geophysical surveys. Thus in some embodiments of the present invention, respective physical property models are normalized, and if any model does not have the specific anomaly value as in the structure No. 0 of FIG. 6B, it is regarded as a boundary or variation zone of individual geological structures and thus is not classified into a specific geological structure and the analysis thereof is excluded.

Based on the above suppositions, the analysis of the geological structure using SI is described below.

Figure 7:
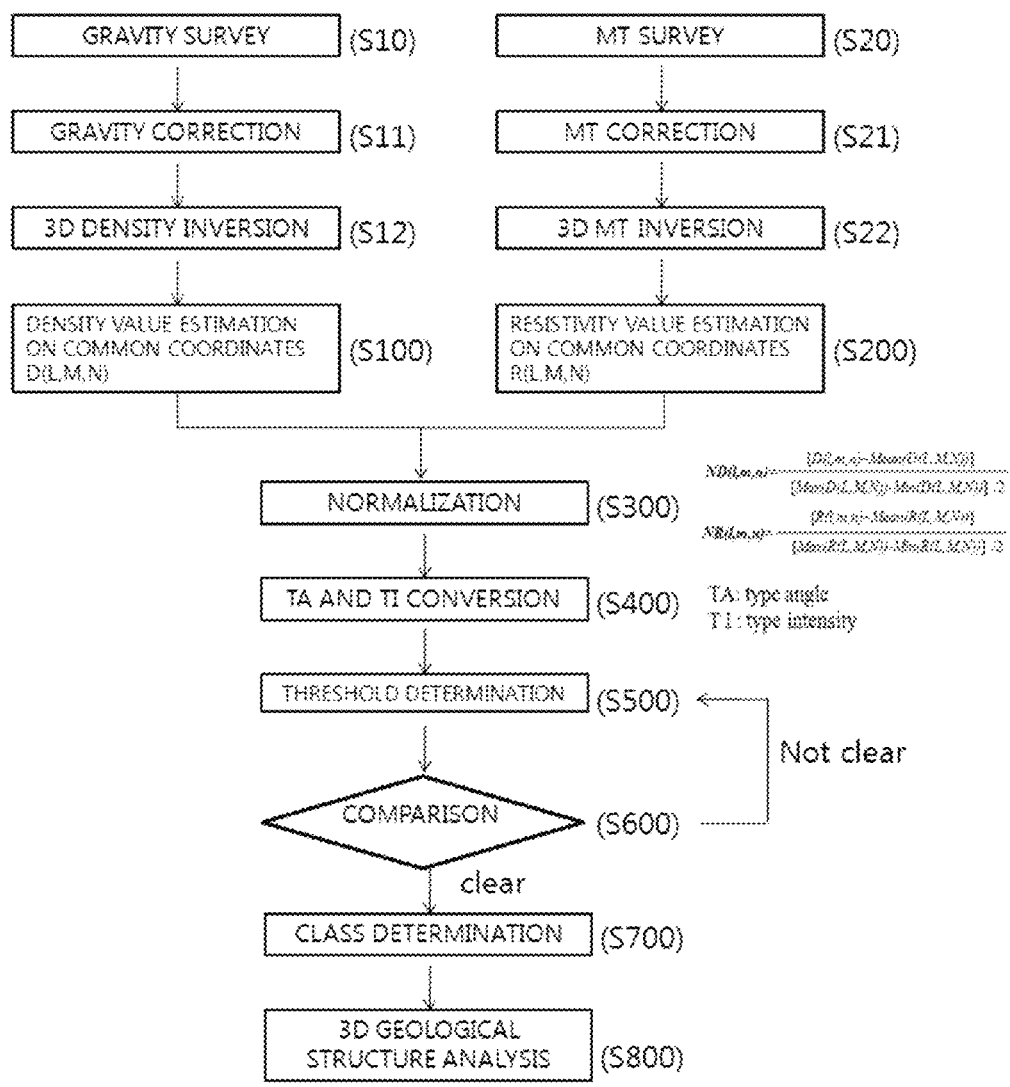
FIG. 7 illustrates a flowchart of the process of analyzing a 3D geological structure using SI according to an embodiment of the present invention.

FIG. 7 is a flowchart illustrating the process of analyzing the 3D geological structure using SI according to an embodiment of the present invention.

Some embodiments of the present invention adopt an analysis method using two physical properties, for example, density and resistivity.

As illustrated in FIG. 7, the density model extracted via 3D density inversion (S12) and the resistivity model extracted via 3D MT inversion (S22) are subjected to density value estimation (S100) and resistivity value estimation (S200) on the common coordinates, respectively, using kriging which estimates data values at any position in the context of the spatial distribution, so as to calculate the density model $D_{data}(L,M,N)$ and the resistivity model $R_{data}(L,M,N)$ on the same 3D grid (L×M×N), thereby acquiring the desired data.

Subsequently, normalization (S300) is performed, and specifically, taking into consideration the distribution of respective physical properties, the density model $D_{data}$ (L,M,N) and the resistivity model $R_{data}$ (L,M,N) present on the same grid are normalized using the following Equation 1, and $ND_{data}$ (l,m,n) and $NR_{data}$ (l,m,n) are plotted in a scatter plot of physical properties.

$$ND=[D-\text{Mean}(D)]/[(\text{Max}(D)-\text{Min}(D))/2] \qquad \text{<Equation 1>}$$

wherein D is the physical property model $D_{data}$ (L,M,N) or $R_{data}$ (L,M,N), and ND is the normalized physical property model.

After normalization (S300), TA and TI conversion (S400) is conducted in such a manner that respective positions of $ND_{data}$ (l,m,n) and $NR_{data}$ (l,m,n) distributed on the scatter plot of physical properties are converted into TA using four-quadrant inverse tangent and into TI using the distance from the origin.

Subsequently, threshold determination (S500) is performed. Specifically, as illustrated in FIGS. 6B and 8B, the effects due to the same structure which may be estimated from the physical property values on the scatter plot of the TA and TI values enables the formation of an independent single class. Based thereon, the minimum of the TI values, which may classify two or more classes, is determined to be the threshold.

Subsequently, comparison (S600) is performed in such a manner that, based on the threshold determined in S500, whether the classes are clearly classified on the scatter plot of the TA and TI values under conditions of being equal to or more than the threshold is determined.

In the comparison (S600), the case where the classes are unclearly classified under conditions of being equal to or more than the threshold turns back to the threshold determination (S500) so that the threshold is re-determined.

When the classes are clearly classified under conditions of being equal to or more than the threshold in the comparison (S600), class determination (S700) is performed, specifically the corresponding value is finally decided as the threshold and the classes are fixed on the scatter plot of the TA and TI values.

Among the classes acquired in S700, respective parabolas having independent maxima in the TI range equal to or above the threshold are classified based on TA, and structure analysis thereof is carried out.

Specifically, 3D geological structure analysis (S800) is performed in such a manner that the rock types and structures are determined in consideration of the physical properties and the geological positions of the classes, and the spatial distribution of respective classes are formed in 3D to analyze the spatial characteristics of the geological structures.

Example

In order to apply the method of analyzing the 3D geological structure using SI according to the present invention, the density and resistivity models of the volcanic caldera distributed on the same coordinates illustrated in FIGS. 5A and 5B are used.

Figure 8A:
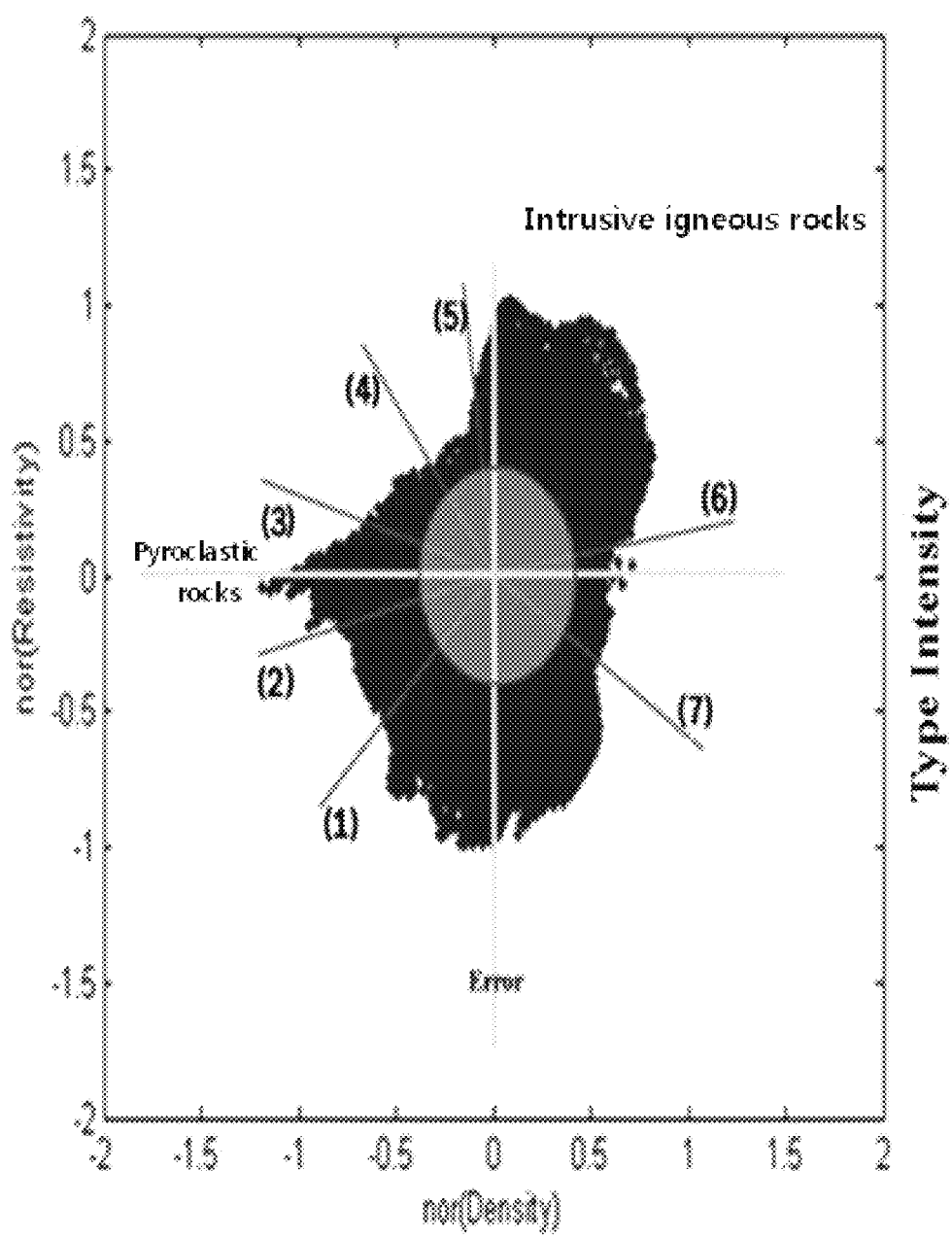
Figure 8B:
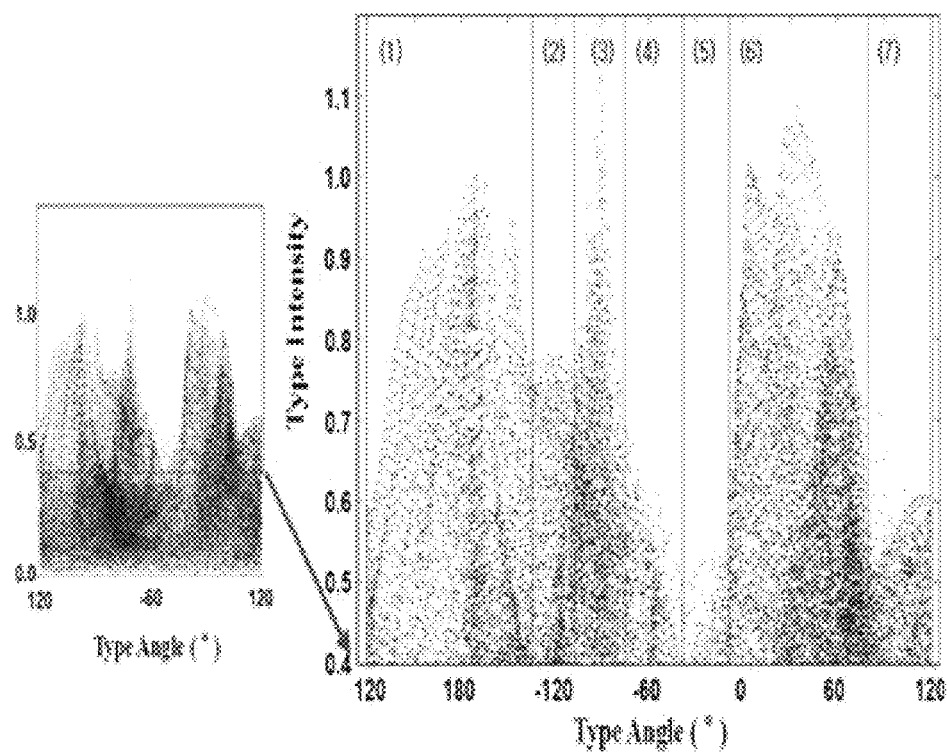

The normalized physical property models are represented in a scatter plot of physical properties as depicted in FIG. 8A, from which TA and TI are calculated as illustrated in FIG. 8B.

To ascertain the applicability of the SI method according to an embodiment of the present invention, geological classes are classified at all the minimum values as possible as seen in FIG. 8B, and to effectively analyze the geological structure of the caldera, the threshold is set to 0.4 at which the parabolas are separated. The ranges of physical properties of the classes are shown in Table 1 below.

TABLE 1

Physical Properties of Respective Classes by SI

| Structure Index | Normalized Resistivity | Resistivity (log(Ω · m)) | Normalized relative Density | Relative Density (g/cm³) |
|---|---|---|---|---|
| Class 1 | −0.5366~+0.5355 | 0.99~2.80 | −0.9882~−0.2023 | −0.043~+0.076 |
| Class 2 | −0.6627~−0.2841 | 2.06~2.79 | −0.5236~−0.2034 | −0.057~−0.015 |
| Class 3 | −0.7607~−0.3482 | 2.41~3.02 | −0.3718~−0.1064 | −0.070~−0.022 |
| Class 4 | −1.1862~−0.3885 | 2.80~3.63 | −0.2000~+0.1624 | −0.115~−0.027 |
| Class 5 | −0.6582~−0.2613 | 3.52~4.16 | +0.1130~+0.3911 | −0.057~−0.013 |
| Class 6 | −0.3176~−0.0722 | 3.98~4.55 | +0.3135~+0.5623 | −0.019~+0.008 |
| Class 7 | −0.1018~+0.8138 | 3.43~5.58 | +0.0729~+1.0118 | +0.005~+0.011 |
| Class 8 | +0.3493~+0.7074 | 2.58~3.47 | −0.2962~+0.0931 | +0.055~+0.095 |

Figure 9:
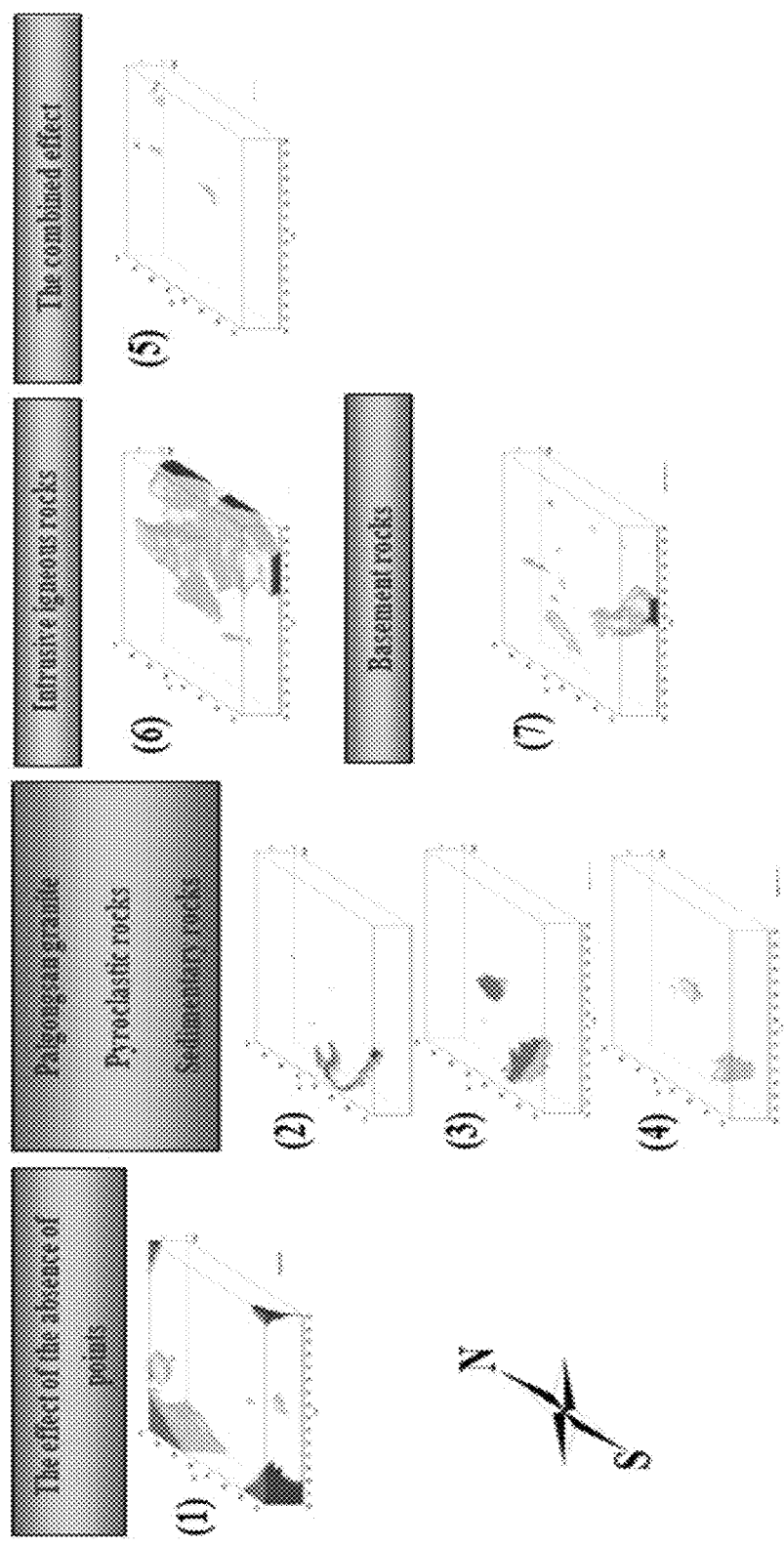
FIG. 9 illustrates 3D images of respective classes classified using the SI process according to an embodiment of the present invention.
Figure 10A:
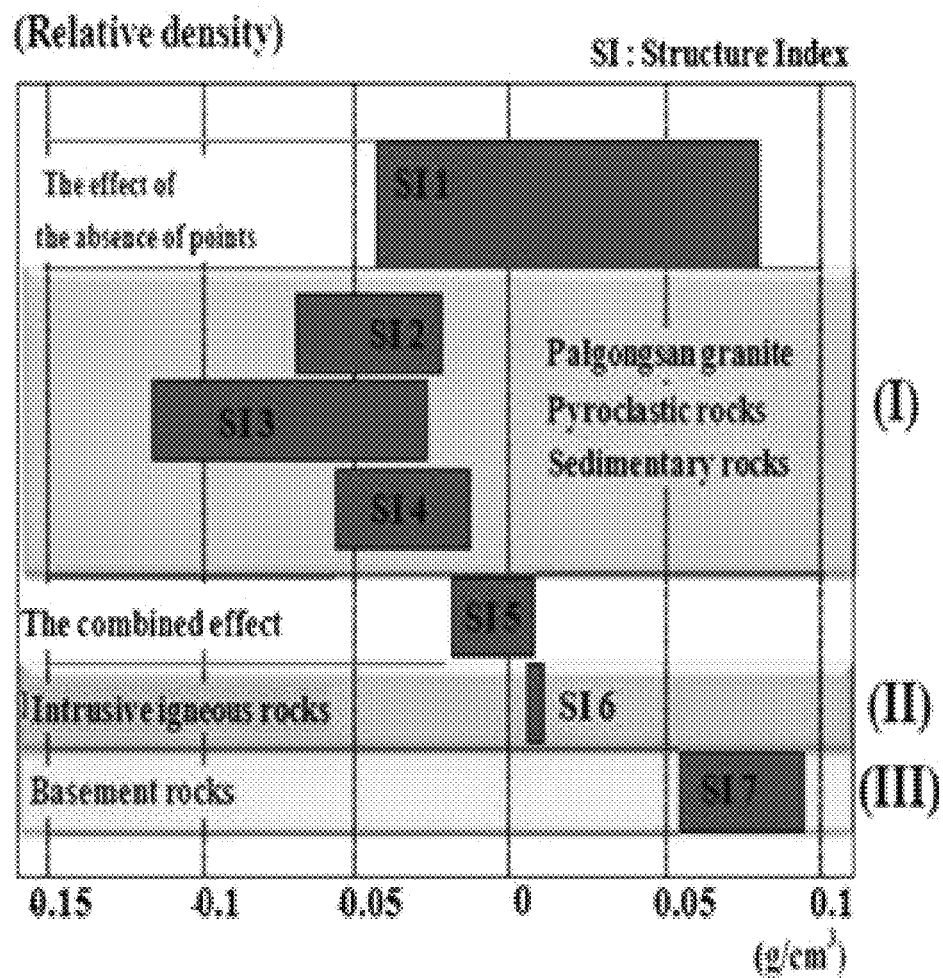
FIGS. 10A and 10B illustrate the physical properties of respective classes classified using the SI process according to an embodiment of the present invention.
Figure 10B:
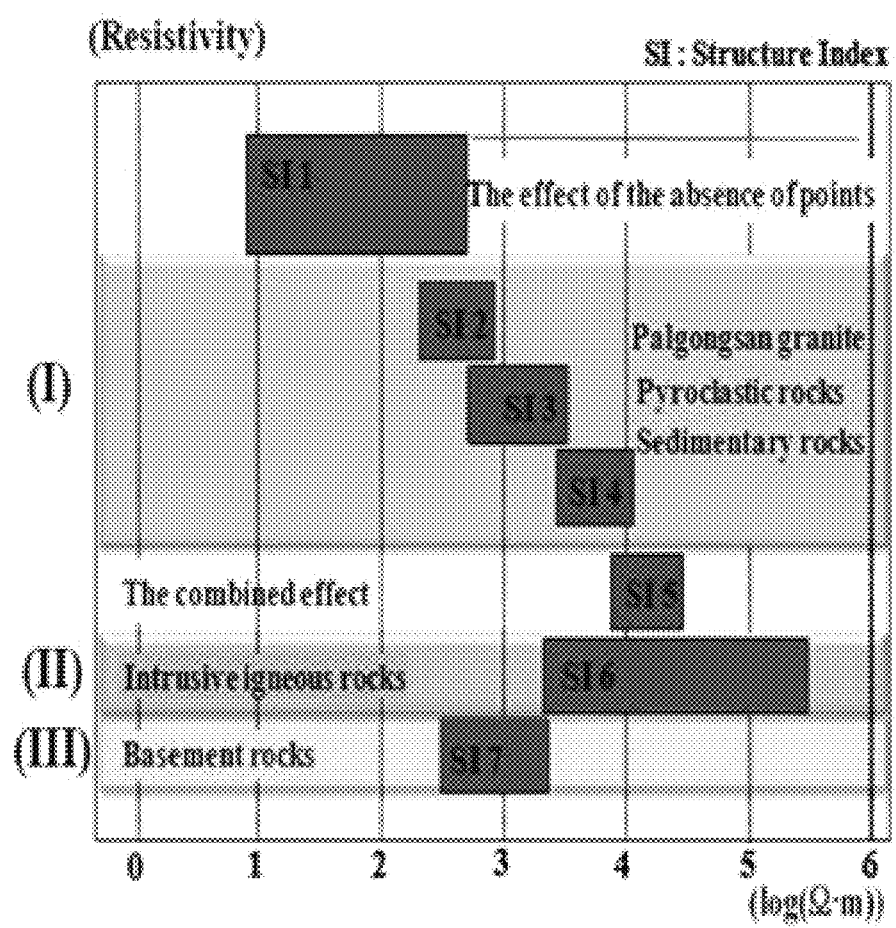

3D images of respective class structures classified using the SI method are depicted in FIG. 9. Considering prior research materials (Yoon Sung-Hyo, 1988, Park Gyesoon et al., 2008, Yang Jun-Mo et al., 2008) and spatial anomaly areas of physical property models, the volcanic caldera area may be largely classified into three types of geological structures via a geophysical survey, as illustrated in FIGS. 9 and 10A and 10B.

1) Classes 2, 3, and 4: Palgongsan Granite and Pyroclastic Sedimentary Rocks above the Center of the Volcanic Caldera This geological structure has a low density which may decrease up to about 0.1 g/cm³ and a low resistivity of about 200 ohm-m. This structure is shown near the center of the volcanic caldera which extends to a depth of about 1 km from the surface of the earth, which includes the pyroclastic sedimentary rocks and the Palgongsan granite. From the fact that the pyroclastic sedimentary rocks are observed up to a depth of about 1 km, it is concluded that the sedimentary rocks were formed by the collapse of the middle of the volcanic body after an initial eruption. However, because the southwestern part of the survey area in which Palgongsan granite is observed not to have any MT survey points, it is difficult to have low resistivity as in the analytic results, and on the contrary, this structure is regarded as having high resistivity because of the properties of granite which has high resistivity. If the MT survey is carried out near the Palgongsan granitic area, the Palgongsan granite and the pyroclastic sedimentary rocks will be able to be analyzed and shown to be different structures.

2) Class 6: Igneous Rocks Intruded in the Ring Fault of the Volcanic Caldera and Intrusive Granite over the Northeastern Part of the Caldera This geological structure has high density and resistivity exceeding 0.1 g/cm³ and 10,000 ohm-m. Such physical properties show the properties of igneous rocks of this area, and manifest the intrusive igneous structure over the ring fault of the volcanic caldera and the northeastern part of the survey area.

3) Class 7: Basement Rocks

This geological structure has high density and comparatively low resistivity. Considering the spatial position of this structure, physical property values, prior research materials, and the geological structure around the volcanic caldera, the above structure is analyzed to be basement rocks or Sindong group of FIGS. 1B and 1C, and has a high density but comparatively low resistivity with respect to the geologic formation having superior electrical conductivity at the lower portion of the Euisung sub-basin proposed by Lee C. K (2006). If analysis is merely based on respective physical property models, this class is not easy to classify apart from class 6 having high density and high resistivity, but the use of the SI method facilitates the classification thereof.

However, as shown in FIGS. 8B and 10A and 10B, class 5 is analyzed to be an intermediate zone of class 4 and class 6 and is not included in structure analysis. Also, the geological structure of class 1 may be different from the others, but is shown at the edge of the survey area due to the absence of gravity and MT measurement points, and thus data for the area in which the reliability of inversion is low may be effectively removed using the SI method.

Figure 11A:
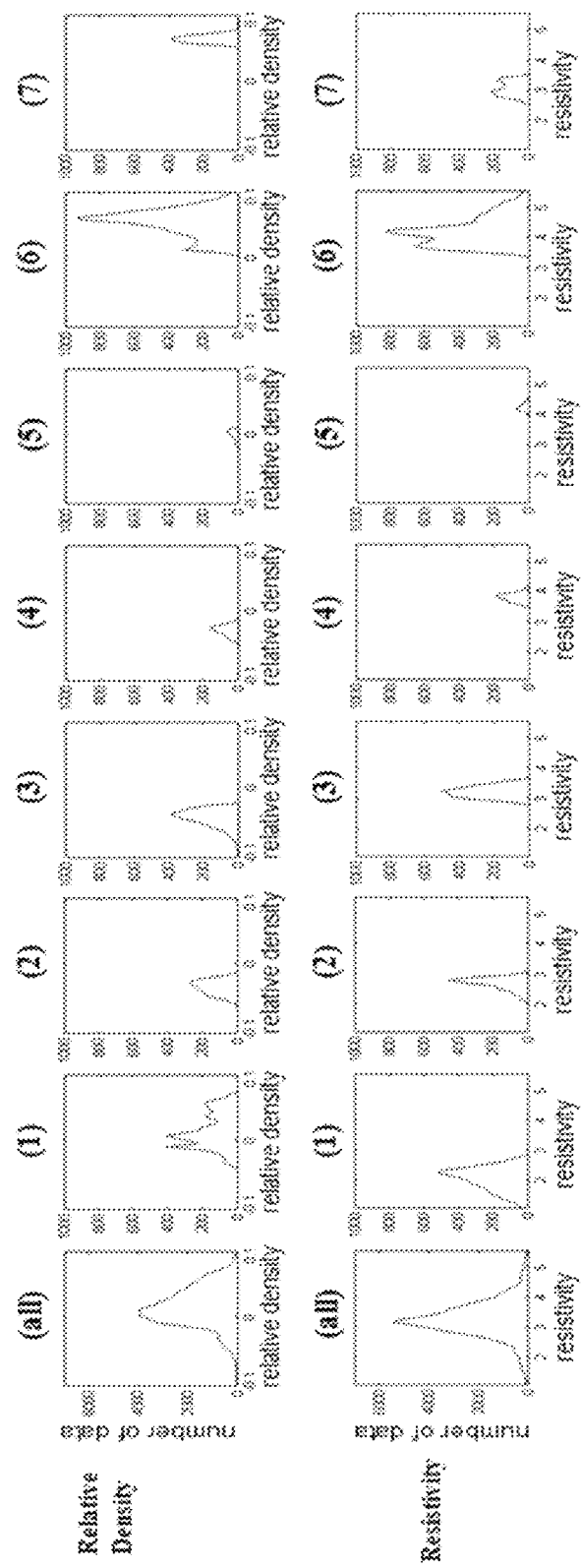
FIGS. 11A and 11B illustrate the distributions of physical properties of respective classes classified using the SI process according to an embodiment of the present invention.
Figure 11B:
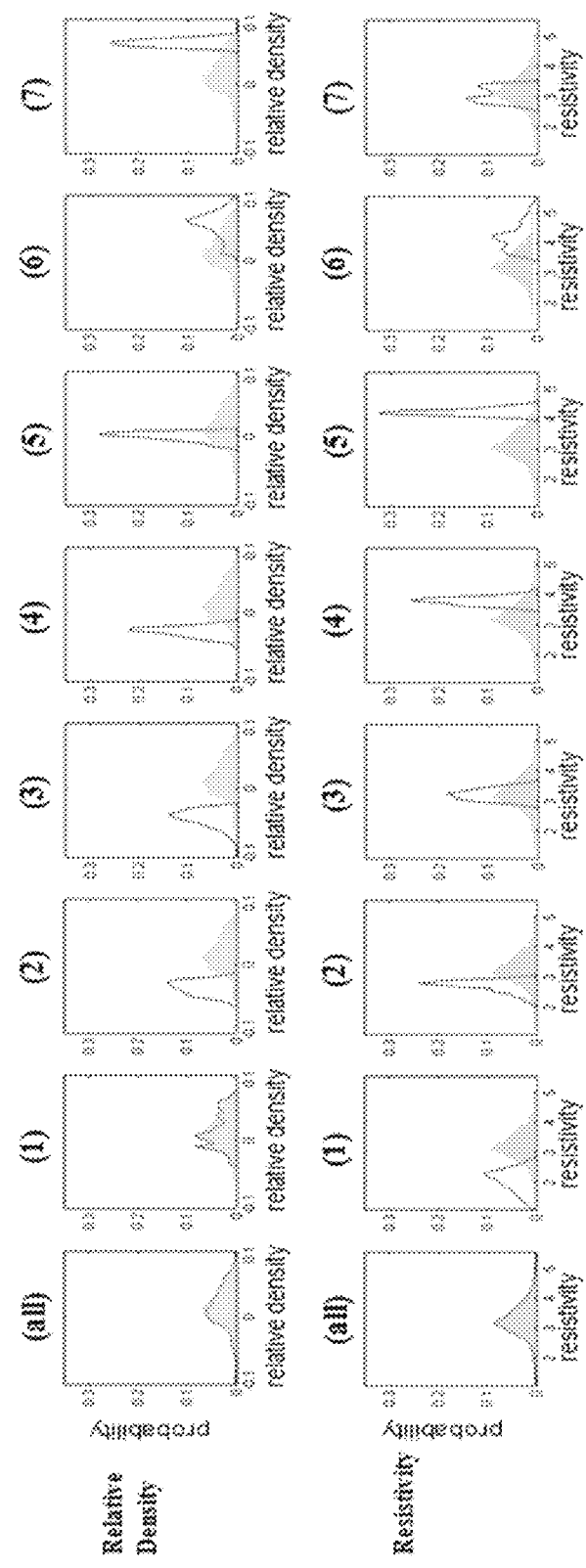

FIG. 11A illustrates the density and resistivity distributions of the entire survey area and respective classes, and FIG. 11B illustrates the probability distributions of the density and resistivity of the entire survey area and respective classes. From this, the range of physical property values of respective classes and the number of outcrops depending on the physical properties may be checked, and thus the physical properties of respective classes may be ascertained at first glance. Also, in the probability distributions of the entire survey area, the physical property values are dispersed over a wide range, whereas the structures of the classes are divided and show the physical property values in narrow ranges. Furthermore upon structure analysis, there may be seen effects in which structures are similar in terms of a single physical property value but may be different in terms of an integrated analysis of two physical properties.

Figure 12:
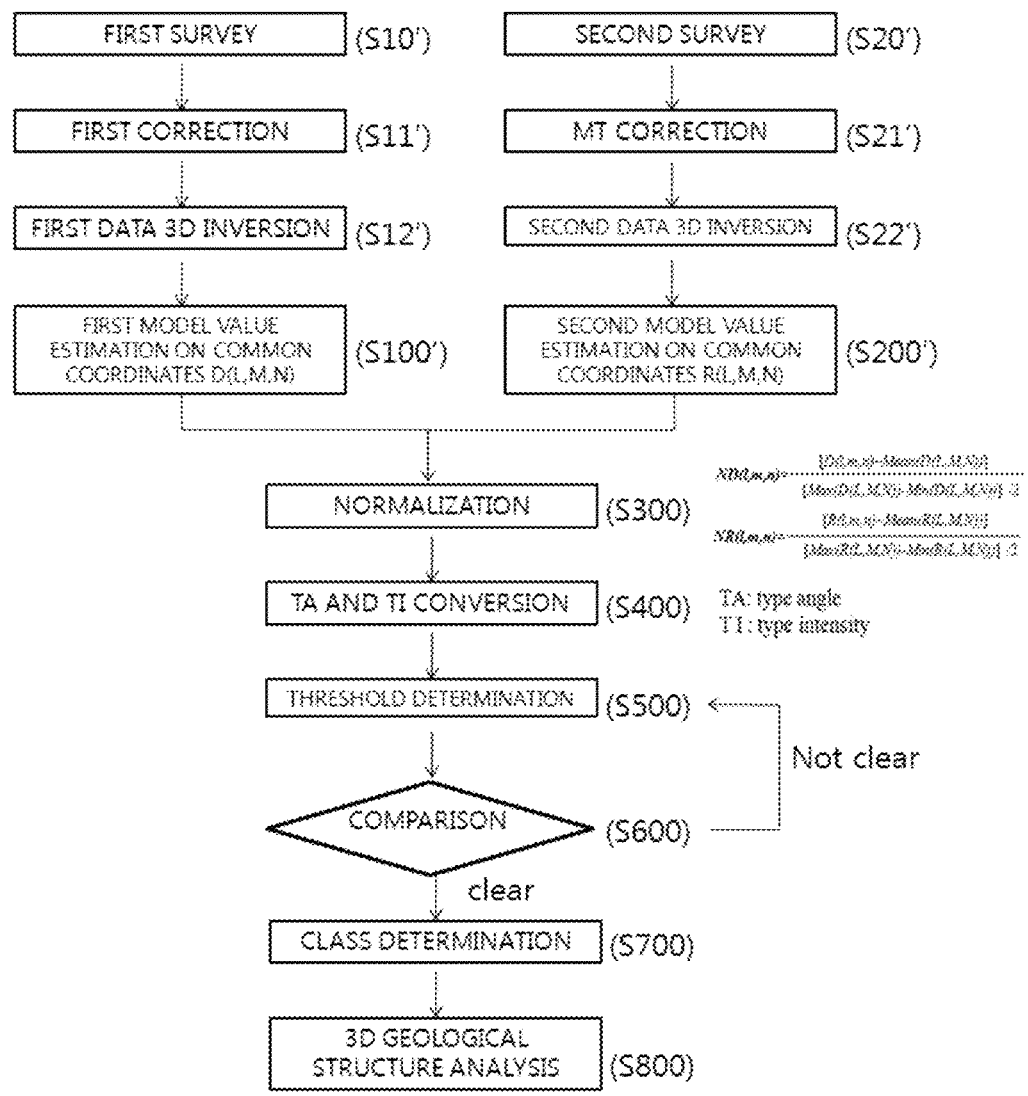
FIG. 12 illustrates a flowchart of a process of analyzing a 3D geological structure using SI according to an embodiment of the present invention.

FIG. 12 illustrates a flowchart of a process of analyzing a 3D geological structure using SI according to another embodiment of the present invention.

In this embodiment of the present invention gravity data and MT data are used as different physical properties. Even when different physical properties other than the gravity data and the MT data are utilized, they may be included in the scope of the present invention.

Figure 13:
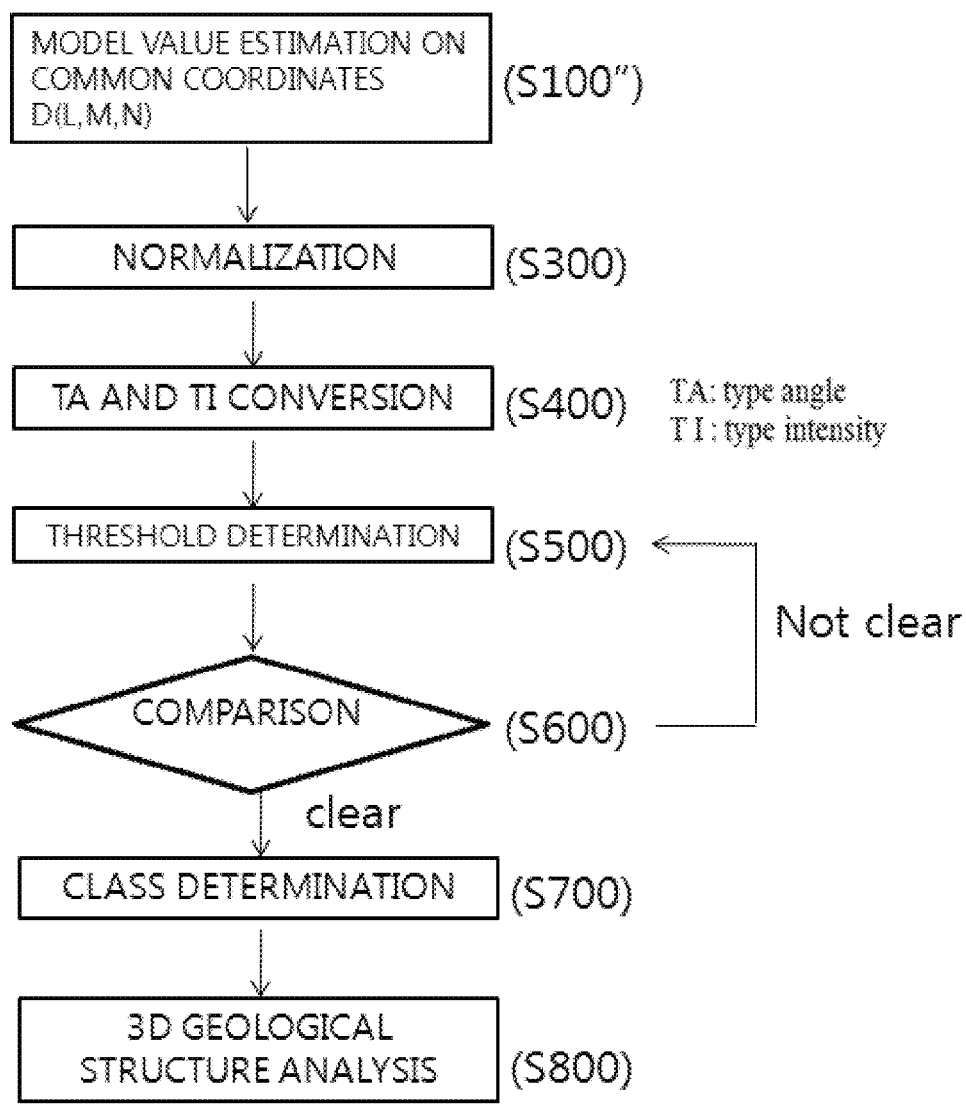
FIG. 13 illustrates a flowchart of a process of analyzing a 3D geological structure using SI according to an embodiment of the present invention.

FIG. 13 illustrates a flowchart of a process of analyzing a 3D geological structure using SI according to a further embodiment of the present invention.

This embodiment of the present invention illustrates gravity data and MT data as different physical properties. Even when different physical properties other than the gravity data and the MT data are utilized, they may be included in the scope of the present invention.

As described hereinbefore, the present invention provides a method of analyzing a 3D geological structure using SI. According to the present invention, the SI method consists of TA and TI values calculated using the spatial correlation of two models in which TA indicates the correlation pattern of two physical properties and TI indicates the distribution position in respective physical property models. The SI method for analyzing the structure using these TA and TI values enables the effective analysis of geological structures using multi-geophysical survey data.

When this method is illustratively applied to imaging the 3D geological structure of the volcanic caldera, effective analysis can be found to be possible.

Also because the SI method is used to classify structures using TA and TI values calculated from the spatial correlation of different physical properties and the distribution thereof, any structure, which is difficult to classify due to similar physical properties when using an independent geophysical survey analysis method, may be classified and analyzed using different physical properties, and the SI method can be effectively employed in 3D imaging.

The 3D underground structure of the volcanic caldera analyzed using different physical properties, for example gravity data and MT data, according to an exemplary embodiment of the present invention correlates well with the wide underground structure resulting from surface geology, existing gravity and magnetic surveys. First, the spatial distribution of intrusive igneous rocks with high density and resistivity values disposed at the ring fault of the volcanic caldera and in the northeastern part of the survey area, and of the pyroclastic sedimentary rocks above the middle of the caldera, which extends to a depth of about 1 km, was analyzed in 3D. Also, the lower basement rocks having a comparatively low resistivity and high density were observed near about 5 km. These results are in good correlation with those of previous research papers.

The SI method according to some embodiments of the present invention can objectively analyze changes in physical properties of each structure and the distribution thereof, and can extract useful information which was not found via individual analysis, and these results are able to serve as basic data for the precise re-analysis of local areas.

Moreover, because the SI method is determined using vectors, it is easy to extend it.

Therefore, even when two or more multi-geophysical surveys are carried out, an integrated analysis can be effectively achieved, and a variety of geophysical survey data in the same area in the future can be objectively and effectively stored in the form of a database and can be effectively applied to the imaging of underground models.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of analyzing a three-dimensional (3D) geological structure, comprising:
   estimating a density value and a resistivity value on common coordinates L, M, and N to calculate a density model $D_{data}$ (L,M,N) and a resistivity model $R_{data}$ (L,M,N) on a same 3D grid (L×M×N), thus obtaining physical property models;
   normalizing the physical property models, thus obtaining normalized physical property models $ND_{data}$ (L,M,N) and $NR_{data}$ (L,M,N) which are then represented in a scatter plot of physical properties;
   converting distribution positions of the $ND_{data}$ (L,M,N) and $NR_{data}$ (L,M,N) on the scatter plot of physical properties into type angle (TA) using a four-quadrant inverse tangent and into type intensity (TI) using a distance from an origin;
   determining a minimum of TI values, which classifies two or more classes on a scatter plot of the TA and TI values, to be a threshold; and
   analyzing the 3D geological structure based on a local extreme point and/or points in the scatter plot for the TA and TI using the threshold,
   wherein analyzing the 3D geological structure is performed by determining a rock type, and a structure depending on physical properties and geological positions of the classes.

2. The method of claim 1, wherein the normalizing is determined by Equation 1 below:

$$ND=[D-\text{Mean}(D)]/[(\text{Max}(D)-\text{Min}(D))/2] \quad \text{<Equation 1>}$$

wherein D is a physical property model $D_{data}$(L,M,N) or $R_{data}$(L,M,N), and ND is a normalized physical property model.

3. The method of claim 2, further comprising comparison which is performed in such a manner that whether or not the two or more classes overlap with each other is determined based on the determined threshold, between determining the threshold and analyzing the 3D geological structure.

4. The method of claim 3, wherein when the two or more classes overlap with each other under conditions of being equal to or more than the threshold, determining the threshold is repeated so that the threshold is re-determined.

5. The method of claim 1, further comprising, before estimating the density value on the common coordinates:
   surveying gravity at a position at which the 3D geological structure is to be analyzed, thus obtaining gravity data;
   correcting the gravity data, thus extracting a Bouguer anomaly; and
   performing 3D density inversion using the Bouguer anomaly, thus obtaining the density model.

6. The method of claim 5, further comprising, before estimating the resistivity value on the common coordinates:
   surveying magnetotelluric (MT) at a position at which the 3D geological structure is to be analyzed, thus obtaining MT data;
   correcting the MT data based on a remote reference, thus acquiring extracted MT data; and
   performing 3D MT inversion using the extracted MT data, thus obtaining the resistivity model.

7. The method of claim 6, wherein the density model and the resistivity model on the common coordinates are estimated using results analyzed via inversion after the common coordinates have been set in the density model and the resistivity model and using ordinary kriging upon estimating the density value and the resistivity value on the common coordinates.

8. A method of analyzing a three-dimensional (3D) geological structure, comprising:
   estimating a first model value and a second model value on common coordinates L, M, and N to calculate a first model $D_{data}$ (L,M,N) and a second model $R_{data}$ (L,M,N) on a same 3D grid (L×M×N) having different physical properties, thus obtaining physical property models;
   normalizing the physical property models, thus obtaining normalized physical property models $ND_{data}$ (L,M,N) and $NR_{data}$ (L,M,N) which are then represented in a scatter plot of physical properties;
   converting distribution positions of the $ND_{data}$ (L,M,N) and $NR_{data}$ (L,M,N) on the scatter plot of physical properties into TA using a four-quadrant inverse tangent and into TI using a distance from an origin;
   determining a minimum of TI values, which classifies two or more classes on a scatter plot of the TA and TI values, to be a threshold; and analyzing the 3D geological structure based on a local extreme point and/or points in the scatter plot for the TA and TI using the threshold, wherein analyzing the 3D geological structure is performed by determining a rock type, and a structure depending on physical properties and geological positions of the classes.

9. The method of claim 8, wherein the normalizing is determined by Equation 1 below:

$$ND = [D - \text{Mean}(D)]/[(\text{Max}(D) - \text{Min}(D))/2] \qquad <\text{Equation 1}>$$

wherein D is a physical property model $D_{data}(L,M,N)$ or $R_{data}(L,M,N)$, and ND is a normalized physical property model.

10. A method of analyzing a three-dimensional (3D) geological structure, comprising:

estimating model values on common coordinates L, M, and N to calculate two or more models on a same 3D grid (L×M×N) having different physical properties, thus obtaining physical property models;

normalizing the physical property models, thus obtaining two or more normalized physical property models which are then represented in a scatter plot of physical properties;

converting distribution positions of the normalized physical property models on the scatter plot of physical properties into TA using a four-quadrant inverse tangent and into TI using a distance from an origin;

determining a minimum of TI values, which classifies two or more classes on a scatter plot of the TA and TI values, to be a threshold; and analyzing the 3D geological structure based on a local extreme point and/or points in the scatter plot for the TA and TI using the threshold, wherein analyzing the 3D geological structure is performed by determining a rock type, and a structure depending on physical properties and geological positions of the classes.

11. The method of claim 10, wherein the normalizing is determined by Equation 1 below:

$$ND = [D - \text{Mean}(D)]/[(\text{Max}(D) - \text{Min}(D))/2] \qquad <\text{Equation 1}>$$

wherein D is a physical property model, and ND is a normalized physical property model.

* * * * *